Figure 1:
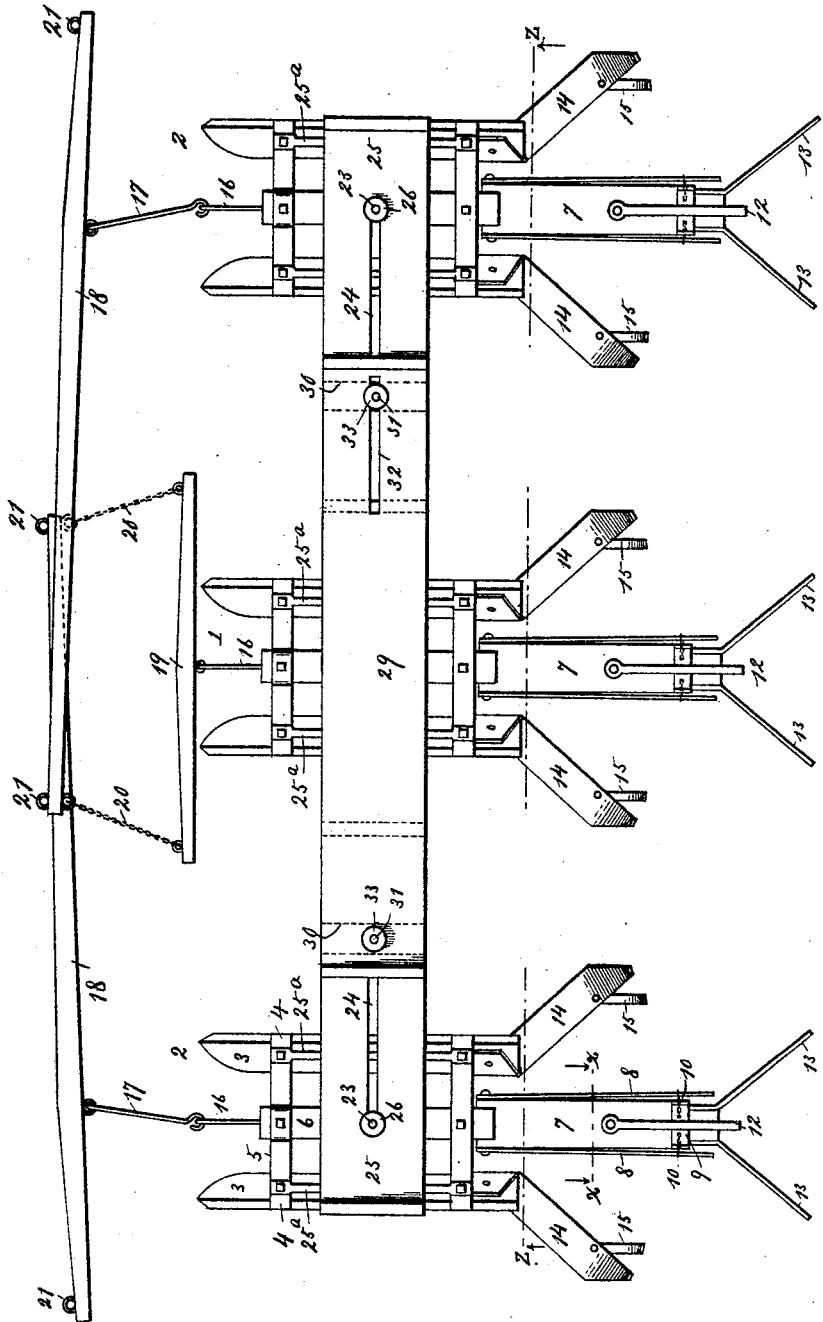

(No Model.) 2 Sheets—Sheet 1.

T. S. WARNER.
THREE ROW CULTIVATOR.

No. 583,272. Patented May 25, 1897.

Witnesses:
F. G. Fischer
G. W. Thorpe

Inventor
T. S. Warner.
By Higdon & Higdon
Attys.

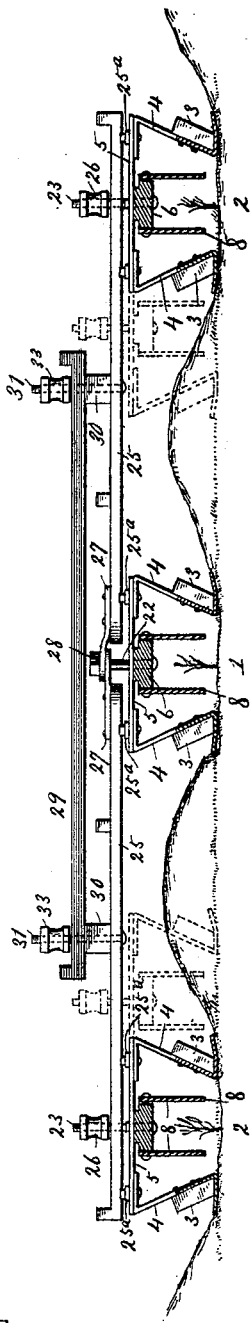

UNITED STATES PATENT OFFICE.

THOMAS S. WARNER, OF FRANKFORT, KANSAS.

THREE-ROW CULTIVATOR.

SPECIFICATION forming part of Letters Patent No. 583,272, dated May 25, 1897.

Application filed September 24, 1896. Serial No. 606,848. (No model.)

*To all whom it may concern:*

Be it known that I, THOMAS S. WARNER, of Frankfort, Marshall county, Kansas, have invented certain new and useful Improvements in Three-Row Cultivators, of which the following is a full, clear, and exact description, reference being had to the accompanying drawings, forming a part thereof.

My invention relates to cultivators, and more particularly to what are known as "three-row" cultivators, and is designed especially as an improvement over the cultivators patented by me on February 5, 1889, and numbered 397,404. The special object in this connection is to produce a triple-row lister-cultivator which will adapt itself to irregularities in the surface of the ground—i. e., a mechanism in which the independent cultivators may rise and fall or move laterally entirely independent of each other and without interfering with the proper operation of the machine as a whole.

The second important object of this improvement is to distribute equally the weight upon all of the cultivators, and a third important object is to provide a draft-equalizer whereby the work will be imposed in equal amount upon all of the draft-animals irrespective of the position of the cultivators.

With these general objects in view the invention consists in certain novel and peculiar features of construction and operation of parts, as hereinafter described and claimed.

In order that the invention may be fully understood, reference is to be had to the accompanying drawings, in which—

Figure 1 represents a top plan view of a triple-row lister-cultivator embodying my invention. Fig. 2 is a vertical section of the same, taken on the line *z z* of Fig. 1. Fig. 3 is a side elevation of the cultivators on an enlarged scale.

Referring to the drawings in detail, 1 designates the middle and 2 the end cultivators. As they are structurally alike a description of one will suffice for all—that is to say, 3 3 designate a pair of downwardly-converging sled-runners, and 4 Z-shaped angle-brackets secured to said runners near their opposite ends.

5 designates cross-bars which bridge the space between said runners and are bolted at their opposite ends to the upper ends of the opposing Z-shaped brackets.

6 designates a longitudinal bar which is bolted or otherwise rigidly secured to the middle of the cross-bars 5, and 7 a rearward extension of the same.

8 8 designate a pair of vertically-adjustable guards for preventing clods of earth from rolling down upon the young and tender plants after they are pushed aside, and said guards are pivoted at their front ends to said extension 7.

9 designates brackets or standards which rise from the extension 7 near its rear end and are notched or bifurcated at their upper ends.

10 designates chains or equivalent devices which are attached to the guards 8 near their rear ends and engage the notches or bifurcations of said standards 9. These chains are employed in order that the guards may be easily and quickly raised or lowered, as occasion may demand.

12 designates a handle which is secured to the extension, and 13 divergently-extending guards. The runners at their rear ends are also provided with the rearwardly-divergent cultivator-arms 14 to loosen the earth to the proper depth, and such arms are bent or curved upwardly at 15 at their rear ends in the customary manner. The construction just described, with the exception of the vertically-adjustable guards, is common in my double-row lister-cultivator, hereinbefore referred to, and to such structure no claim is herein made. The following relates principally to the improvements which I have invented to adapt such cultivators for successful use for cultivating three rows of listed corn at a time: The forwardly-projecting arm or rod 16 of each end cultivator is connected by links 17 with the draft-equalizing bars 18 at points about one-third of their length from their outer ends. The rod or arm 16 of the middle cultivator is pivotally connected to the middle of a bar 19, and said bar in turn is connected, by means of the chains or equivalent flexible connections 20, to eyebolts projecting rearwardly from the opposite or inner ends of the two bars 18, and projecting outwardly from the opposite ends of said bars are eyebolts or clips 21, to which a corresponding number of singletrees (not shown) may be attached in the customary manner.

22 designates a vertical and upwardly-projecting bolt carried by the bar 6 of cultivator 1.

23 designates similar bolts which project upwardly from the corresponding bars of the end cultivators, all of the said bolts being arranged about the middle of the cultivators. The bolts 23 project loosely upward through longitudinal slots 24 in a pair of horizontal bars 25, which rest at their outer ends upon the horizontal rods 25ª, bolted or otherwise secured at their opposite ends to the crossbars 5 of the end cultivators, and at their inner ends said bars 25 rest upon the adjacent rod 25ª of the middle cultivators. The slotted ends of said bars are permitted to operate in a horizontal plane, both pivotally and slidingly, upon the bolts 23, but are maintained in such horizontal plane against accidental displacement by means of the nuts or collars 26, which engage the upper ends of said bolts. At their inner ends said bars 25 carry the overlapped plates 27, which are pivotally mounted upon the bolt 22, and are maintained in such relation by means of the nut 28, as shown clearly in Fig. 2.

From the foregoing it is obvious that should one or more of the draft-animals pull forward beyond the other the cultivator or cultivators directly in the rear of said animals will be advanced beyond the remaining cultivators, but the proper operation of none of them will be interfered with, owing to the fact that the sliding connection between the cultivators permits them thus to vary their positions. It is also obvious that the equal distribution of work imposed upon the animals employed by reason of my improved draft-equalizer is not varied, as it is obvious that the tendency of each animal to advance beyond the others is counteracted by the pulling strain of two other animals, each of which also counteracts the efforts of the other. It is also obvious that if by reason of the unevenness of the rows it is necessary that the cultivators vary their lateral position in relation to each other it is automatically accomplished, as they, by reason of the slide-bar connections, are self-adjustable and follow the furrow, no matter how crooked or narrow or wide in places.

In order that the weight of the rider may be equally distributed on all of the cultivators, I place a transverse bar 29 near its opposite ends upon the cleats 30, secured upon the bars 25 inward of their slots. Said bar 29 is provided at one end with a hole through which the upwardly-projecting bolt 31, carried by one of the bars 25 and cleats 30, projects, and the corresponding bolt 31, carried by the other bar and cleat, projects upwardly and loosely through a longitudinal slot 32, formed in the bar 29. Said bar is held down upon cleat 30 by means of the nuts or collars 33 engaging the threaded upper ends of said bolts. By thus slotting said bar 29 it does not interfere in the least with the lateral independent movement of any of the cultivators, and it is equally obvious that its pivotal connection at each end of the bolts 31 prevents any interference with the forward independent movement of any of said cultivators.

In the practical operation of the machine four animals are hitched to it, and they walk between the rows in the customary manner, the cultivators occupying the respective positions with relation to plants shown in Fig. 2.

From the above description it is obvious that I have produced a triple-row lister-cultivator which embodies the advantageous features of construction set out in the statement of invention, and it is also obvious that I have produced a machine of this character which embodies in a high degree simplicity, strength, durability, and cheapness of manufacture.

Having thus described my invention, what I claim as new, and desire to secure by Letters Patent, is—

1. A triple-row cultivator comprising a series of three cultivators, bolts projecting upwardly therefrom, a pair of transversely-extending boards pivotally connected at their inner ends to the upwardly-projecting bolt of the middle cultivator, and provided near their outer ends with longitudinal slots through which project the bolts of the end cultivators, and collars or nuts secured upon the upper ends of said bolts to hold said boards in position, substantially as described.

2. In a triple-row cultivator, the combination with a series of three cultivators, bolts projecting vertically upward therefrom, and rods projecting forwardly therefrom, boards arranged horizontally and pivotally connected at their inner ends to the bolt of the middle cultivator, and provided with longitudinal slots near their outer ends through which loosely project the bolts of the end cultivators, and a draft-equalizer connected to said forwardly-projecting rods, substantially as described.

3. In a triple-row cultivator, the combination with a series of three cultivators provided with vertical upwardly-projecting bolts and with longitudinal supporting-rods at opposite sides of said bolts, and transverse boards resting upon said bars and pivotally connected at their inner ends upon the bolt of the middle cultivator, and provided near their outer ends with longitudinal slots which pivotally and slidingly engage the bolts of the end cultivator, of a draft-equalizer consisting of a pair of long bars arranged transversely and overlapping each other at their inner ends, link-rods connecting said bars nearer their outer than their inner ends to the end cultivator, a third and shorter bar connected to the middle cultivator and linked at opposite ends to the adjacent ends of the overlapping, first-named bars, substantially as described.

4. In a triple-row cultivator, the combination with a series of three cultivators, bolts projecting upwardly therefrom, horizontal transverse boards resting upon the end cultivators at their outer ends and at their inner ends upon the middle cultivator and pivotally connected to the vertical bolt of said middle cultivator, and provided with longitudinal slots which loosely and slidingly embrace the vertical bolts of the end cultivators, and supporting-blocks secured upon said boards inward of said slots, of a weight-equalizing board resting near its opposite ends upon said blocks and provided with a slot at one end, a bolt extending vertically upward from one of said cleats through said slot and a similar bolt extending upward from the other cleat and pivotally through said board, substantially as described.

5. In a triple-row cultivator, the combination with a series of three cultivators, bolts projecting vertically upward therefrom, boards resting upon the middle cultivators at their inner ends and provided with overlapping bearing-plates which are pivotally mounted upon the bolt of said cultivator, and resting at their outer ends upon the end cultivator and provided with longitudinal slots which slidingly and pivotally embrace the vertically-projecting bolts of said end cultivator, and nuts engaging said bolts to hold said boards in proper position, of cleats secured to said boards at the inner ends of said slots, bolts projecting upwardly therefrom, a board pivotally mounted upon one of said bolts and resting upon the cleats and provided with a slot at its opposite end which embraces loosely and slidingly the companion bolt, nuts engaging the upper end of said bolts and a four-horse draft-equalizer connected to said cultivator, substantially as described.

In testimony whereof I affix my signature in presence of two witnesses.

THOMAS S. WARNER.

Witnesses:
 F. M. WARNER,
 HERMAN JOHNSON.